United States Patent
Julen et al.

(10) Patent No.: US 10,862,385 B2
(45) Date of Patent: Dec. 8, 2020

(54) LINEAR MOTOR DRIVE SYSTEM (71) Applicant: InDriveTec AG, Zurich (CH)

(72) Inventors: Eric Julen, Zurich (CH); Martin Vinzens, Zurich (CH)

(73) Assignee: INDRIVETEC AG, Zurich (CH)

( * ) Notice: Subject to any disclaimer, the term of this patent is extended or adjusted under 35 U.S.C. 154(b) by 344 days.

(21) Appl. No.: 15/737,012

(22) PCT Filed: Jun. 14, 2016

(86) PCT No.: PCT/EP2016/063633
§ 371 (c)(1),
(2) Date: Dec. 15, 2017

(87) PCT Pub. No.: WO2016/202798
PCT Pub. Date: Dec. 22, 2016

(65) Prior Publication Data
US 2018/0159416 A1 Jun. 7, 2018

(30) Foreign Application Priority Data
Jun. 16, 2015 (EP) ...................................... 15405041

(51) Int. Cl.
*H02K 41/03* (2006.01)
*B60L 13/03* (2006.01)
(Continued)

(52) U.S. Cl.
CPC ............ *H02K 41/031* (2013.01); *B60L 13/03* (2013.01); *B61B 13/08* (2013.01); *E21B 3/02* (2013.01);
(Continued)

(58) Field of Classification Search
CPC .... H02K 41/031; H02K 11/215; H02K 11/33; H02K 9/22; H02K 9/19; H02K 11/21;
(Continued)

(56) References Cited

U.S. PATENT DOCUMENTS 6,064,172 A * 5/2000 Kuznetsov ........... G01R 31/346
318/434
10,476,324 B2 * 11/2019 Hosek .................. H02K 1/2706
(Continued)

FOREIGN PATENT DOCUMENTS

DE      28 06 601 A1    8/1979
DE      19728977 A1    6/1998
(Continued)

*Primary Examiner* — Michael C Zarroli
(74) *Attorney, Agent, or Firm* — Birch, Stewart, Kolasch & Birch, LLP (57) ABSTRACT

The invention relates to a linear motor drive system for the acceleration of a vehicle within an acceleration section on a travel route. The linear motor drive system comprises a stator with at least two stator elements arranged along the travel route, the stator elements are assembled to form at least two stator groups. Moreover, the linear motor drive system comprises a rotor, which is secured on the vehicle. Each stator group is permanently connected to its own at least one energy transformer for its power supply, which can be individually actuated. At least two of the stator groups are arranged such that the rotor can interact at the same time with the at least two stator groups. The invention furthermore relates to the use of the linear motor drive system for the acceleration of a vehicle 3 for passenger transportation in an amusement park.

20 Claims, 4 Drawing Sheets (51) Int. Cl.
  *H02K 11/33*   (2016.01)
  *H02K 9/19*    (2006.01)
  *H02K 11/215*  (2016.01)
  *B61B 13/08*   (2006.01)
  *E21B 19/02*   (2006.01)
  *H02K 9/22*    (2006.01)
  *E21B 19/08*   (2006.01)
  *E21B 3/02*    (2006.01)
  *H02K 11/21*   (2016.01)

(52) U.S. Cl.
  CPC .............. *E21B 19/02* (2013.01); *E21B 19/08* (2013.01); *H02K 9/19* (2013.01); *H02K 9/22* (2013.01); *H02K 11/215* (2016.01); *H02K 11/33* (2016.01); *H02K 11/21* (2016.01)

(58) Field of Classification Search
  CPC . E21B 3/02; E21B 19/08; E21B 19/02; B61B 13/08; B60L 13/03
  See application file for complete search history.

(56) References Cited

U.S. PATENT DOCUMENTS

| | | | |
|---|---|---|---|
| 10,560,011 B2* | 2/2020 | Himmelmann | H02K 11/21 |
| 2012/0242085 A1* | 9/2012 | Garfinkel | F03D 7/0204 |
| | | | 290/44 |
| 2015/0048693 A1 | 2/2015 | Prüssmeier | |
| 2015/0131207 A1* | 5/2015 | Urai | H01H 33/42 |
| | | | 361/618 |
| 2016/0226349 A1* | 8/2016 | Mastrocola | H02K 11/21 |

FOREIGN PATENT DOCUMENTS

| | | |
|---|---|---|
| DE | 197 48 911 A1 | 5/1999 |
| DE | 10 2012 204 916 A1 | 10/2013 |
| EP | 1 168 585 A2 | 1/2002 |
| EP | 2 156 979 A1 | 2/2010 |
| EP | 2 645 547 A2 | 10/2013 |
| FR | 2259472 A1 | 8/1975 |
| GB | 1245687 | 9/1971 |
| WO | WO 99/24284 A1 | 5/1999 |

* cited by examiner

LINEAR MOTOR DRIVE SYSTEM

TECHNICAL FIELD

The invention relates to a linear motor drive system for the acceleration of a vehicle within an acceleration section on a travel route, especially for passenger transportation in an amusement park. The linear motor drive system comprises a stator with at least two stator elements with stator windings arranged along the travel route, wherein the stator elements are assembled to form at least two stator groups. Moreover, the linear motor drive system comprises a rotor, which is secured on the vehicle and which is able to interact with a magnetic field generated by the stator. The invention furthermore relates to the use of the linear motor drive system for the acceleration of a vehicle for passenger transportation in an amusement park, all of this according to the preambles of the independent claims.

PRIOR ART

Many drive systems are known for amusement parks. For example, it is known how to drive a passenger vehicle by a hydraulic system. Systems are also known which are based on flywheel drives and pneumatic drives. The trend is toward ever faster speeds and higher accelerations, in order to achieve a greater thrill. Electric linear motors are becoming increasingly common. These reach their limits today at around 160 km/h and fall short of the maximum speeds of 240 km/h achieved with hydraulically driven systems. Yet the use of linear motors for the driving of vehicles in amusement parks offers many benefits. Linear motors are free of wear, they can be operated with better energy economy, and they enable a more specific control of the position and the speed of the vehicle.

Usually the stator being the active part of the linear motor is significantly longer than the rotor, being the passive part and secured to the vehicle. Since the flow of current through the entire stator would result in major losses, the stator is only energized for a section. For example, WO 99 242 84 calls for connecting individual stator sections in series and bridging over the stator sections not contributing to the propulsion force by parallel connected switch devices. Since at least two stator groups must always be energized at the same time for a constant transmission of force to the stator, the design voltage of a stator section must be reduced on account of the series circuit. The maximum design voltage of a linear motor drive system is generally limited on account of technical limitations such as the voltage strength of a semiconductor switch and also regulatory or safety-relevant requirements. Likewise, the maximum possible motor current is limited by technical and economic constraints. Therefore, the series circuit reduces the maximum achievable drive power of the electric linear motor drive system. At the same time, the voltage drop at the power switches in the parallel connected switch devices results in energy losses. A different approach is advocated by EP 2 156 979, which comprises at least two energy supply units, and in which the stator sections are assigned in the form of stator groups to the energy supply units, the stator sections of the individual stator groups alternating along the linear motor and the stator sections of a stator group being connected in parallel each time. Only the stator sections of the parallel connected stator sections of a stator group that contribute to the force transmission are switched on by a controlled switch depending on the position of the rotor. The switches can be switched free of load and the losses are reduced. But in order to make possible a load-free switching, the rotor length must be adapted to the stator length and to the product of the switching time of the switch and the maximum propulsion speed. Yet this requires a reducing of the rotor length, which also reduces the performance of the drive system.

PRESENTATION OF THE INVENTION

The problem which the invention proposes to solve is to create a linear motor drive system belonging to the above-mentioned technical field, which makes it possible to accelerate to a high speed on a shorter acceleration stretch and at the same time reduce the manufacturing costs and the maintenance costs.

The solution of the problem is defined by the features of claim 1. According to the invention, each stator group is permanently connected to its own at least one energy transformer for its power supply, which can be individually actuated. At least two of the stator groups are arranged such that the rotor can interact at the same time with the at least two stator groups, so that these at least two stator groups can be supplied with energy at the same time from their own energy transformer. In order to increase the acceleration of the vehicle, the stator is furthermore preferably actively cooled.

The linear motor drive system according to the invention makes it possible to generate higher acceleration performance and thus also large drive forces at high speeds. In this way, the acceleration stretch and thus also the length of the stator can be shortened. At the same time, switches can be eliminated, since a switching between the individual stator groups is no longer necessary. This eliminates not only the costs for the switch elements, but also energy costs due to a voltage drop on the switch or energy losses due to the switching. At the same time, a large and costly energy transformer can be replaced by smaller and significantly more economical energy transformers. This likewise reduces the manufacturing and maintenance costs.

An acceleration in the context of this invention means both a positive and negative acceleration. In the case of a positive acceleration, the speed of the vehicle is increased, while in a negative acceleration the speed of the vehicle is reduced or the vehicle is braked. In the latter case, the acceleration section corresponds to a braking section or a slowdown section. The travel route in the area of the acceleration section can be straight, curved, or inclined.

A permanent connection between a stator group and the at least one power supply unit means a connection which can exist independently of the position of the rotor along the travel route and consequently requires no making or breaking of the connection in dependence on the position of the rotor. However, it is possible for a permanent connection between a stator group and an energy transformer connected to the stator group to comprise an isolating switch, which is able to interrupt or short circuit the connection between the stator group and the respective energy transformer in order to provide for safety requirements, for example. These safety requirements include, among others, the power disconnection for entering and exiting of the passengers, as well as maintenance work, or also the power disconnection or short circuiting of the stator groups and/or stator elements in order to brake the vehicle in an emergency situation.

Thanks to the active cooling of the stator, the propulsive force of the linear motor drive system and thus the maximum achievable performance can be further increased. An active cooling in the context of the invention means a forced fluid cooling, i.e., a gas or also a liquid cooling. In a gas cooling, the gas for dissipating the heat is led across the outer surfaces of the stator or through cooling ducts through the stator. Preferably in a cooling with gas the ambient air is used as the cooling agent. The cooling agent used may be further cooled down by a heat exchanger. In a liquid cooling, a cooling liquid is used to dissipate the heat. For this, the stator elements are provided with cooling ducts through which cooling liquid is led for dissipating the heat. The cooling liquid is preferably supplied by a closed cooling circuit and actively cooled by a heat exchanger. A combination of a liquid cooling and a gas cooling is also possible.

Alternatively, the stator may also be passively cooled, for example, by cooling bodies arranged on the outside of the stator, cooling surfaces integrated in the stator, or also by thermal conductive connections between the stator or the stator elements and the travel route on which the stator elements are arranged.

The different cooling forms mentioned above may also be combined with each other.

The energy exchange between energy transformer and stator group may preferably occur in two directions: on the one hand, a stator group may be supplied with energy by the at least one energy transformer connected across the permanent connection. But on the other hand it may also surrender energy to the at least one energy transformer connected across the permanent connection. In the former case it works like a motor, in the latter like a generator.

In another embodiment, at least three of the stator groups are arranged such that the rotor can interact at the same time with the at least three stator groups, so that these at least three stator groups can be supplied with energy at the same time by their own energy transformer.

Of course, it is possible for the linear motor drive system to comprise, besides a first rotor, also additional rotors, each of which is secured to another vehicle. Likewise, the linear motor drive system may comprise additional stators for the acceleration of a vehicle within additional acceleration sections.

In another preferred embodiment, an effective length of the rotor is longer than an effective length of a magnetic field generated by two consecutive stator groups, but preferably shorter than an effective length of the stator. The effective length of the rotor means the extension of an effective region of the rotor along the vehicle in the direction of the travel route in which a magnetic field of the rotor is able to interact with the magnetic field of the stator. The effective length of the stator means accordingly the extension of an effective region of the stator along the travel route on which the magnetic field of the stator is able to interact with the magnetic field of the rotor. Similarly, the effective length of two consecutive stator groups means the extension of the effective region of the two consecutive stator groups along the travel route in which a magnetic field of the two consecutive stator groups is able to interact with the magnetic field of the rotor. The effective length of a single stator element is defined accordingly.

Stator groups are considered to be consecutive if their stator elements are arranged spatially one behind the other in succession in the direction of the travel route. Even in a single-row stator layout the motor energy of two or more energy transformers may then be transmitted at the same time from the stator to the rotor, or generator energy may be fed back from the rotor via the stator to two or more energy transformers. The stator groups or the stator elements may be directly connected to one another in the direction of the travel route or they may also have gaps, so that the effective regions of the stator and/or the stator groups may have gaps within their respective effective length along the travel route. However, these gaps must be shorter than the effective length of the rotor, or else there would be positions in the effective region of the stator in which the rotor is not able to interact with the stator, and in which consequently no propulsive force can be generated on the rotor.

A simultaneous transmission of the energy of at least two energy transformers is also possible, however, when at least two stator groups are arranged overlapping parallel to the travel direction or in the direction of the travel route and their effective region is overlapped by the effective length of the rotor.

The benefit of the preferred embodiment with stator groups arranged spatially in the direction of the travel route is a narrower and generally also more economical stator. The benefit of the parallel or overlapping arrangement is a shorter rotor.

In a special embodiment the effective length of the rotor is longer than the effective length of two stator groups arranged spatially one behind the other, wherein at least one additional stator group is arranged parallel to the two stator groups arranged spatially one behind the other, so that the effective region of the additional stator group lies, in relation to the travel route, within the effective region of the two stator groups arranged spatially one behind the other. In this way, it is possible to transmit the energy from at least three inverters across the stator to the rotor at the same time.

Preferably, the effective length of the rotor is longer than the effective length of two consecutive stator groups, but also shorter than the effective length of the stator. Such a linear motor drive system is a long-stator linear motor drive system. Such a long stator consequently comprises at least three stator groups and at least three stator elements. In this preferred embodiment, the rotor in at least one position within the acceleration section on the travel route can interact along its entire effective length with the magnetic field of the stator in order to generate a propulsive force or a braking force.

In especially long vehicles, usually vehicles consisting of several cars, the effective length of the rotor may however also be longer than the effective length of the magnetic field of the stator. In this case, all stator groups may contribute at the same time to the force transmission when the vehicle is located with the entire effective length of the rotor in the effective region of the stator.

In a preferred embodiment the effective length of the rotor is distributed over the length of the vehicle.

A vehicle may consist of several cars arranged one behind the other in a row. The cars are joined together by connection elements, which maintain constant distances between the cars in the direction of the travel route, yet allow changes in angle and/or small relative transverse movements of the cars with respect to each other. The connection elements may comprise, for example, simple joints, ball joints or universal joints. But joint-free couplings can also be used, being outfitted for example with an element which is elastic in the transverse direction. Non-mechanical elements such as magnetic couplings may also be used as the connection elements. The rotor of a vehicle encompassing more than one car is preferably divided over more than one car, so that the effective length of the rotor is also divided over several vehicles.

In such a preferred linear motor drive system the attainable acceleration is almost independent of the length of the vehicle, since the propulsive force of the linear motor drive system is likewise proportional to the vehicle length, as is the accelerating mass of the vehicle, because more stator groups per length of the vehicle can be supplied with energy and can interact with the rotor.

An overall effective length is composed of the added effective lengths of the individual rotor elements of which the rotor of a vehicle is composed. For example, only every n-th car may be provided with a rotor element, so that the overall effective length is reduced, while the effective length of the rotor may be the same as in a vehicle where rotor elements are arranged on each car along the entire length. It is likewise possible for the stator to contain gaps in its longitudinal extension, for example, individual stator elements may be replaced by brake elements. This is especially possible in regions of the travel route in which a lesser acceleration is required. The brake elements for example enable a braking of the vehicle in the event of a backward rolling of the vehicle on account of an emergency situation or a power outage.

The linear motor drive system according to the invention can then still operate when an energy transformer is down.

In another preferred embodiment the linear motor drive system according to the invention comprises a feed unit and an at least two-strand power supply bus. The power supply bus is preferably a d.c. voltage bus. The power supply bus may be connected across the feed unit to a power grid. The energy transformers may be supplied with energy across the power supply bus.

Several energy transformers may be connected to a common feed unit by the power supply bus. The power supply bus also enables an energy exchange between the feed unit and the energy transformers, and also between the energy transformers themselves. Especially preferably, a single feed unit is used.

The feed unit makes possible the connection to a power grid, preferably a public power grid. The power grid may be a d.c. or an a.c. power grid, especially a rotary current power grid.

The power supply bus may be divided, for example, down the middle into two strands, so that the distance of the energy transformer from the feed unit and/or the length of the power supply bus is minimized Preferably, the power supply bus is a two-strand d.c. voltage power supply bus, making possible an extensive decoupling of the feed unit and the energy transformer by a d.c. voltage intermediate circuit with slight wiring expense. Especially preferred is a d.c. voltage intermediate circuit making possible a simple parallel connection of the energy transformers, for example as compared to a current intermediate circuit. In the case of a connection to an alternating voltage grid and a d.c. voltage power supply bus, the feed unit comprises a rectifier for transforming the alternating voltage into a d.c. voltage. The rectifier may have a passive as well as an active design. The feed unit with an active converter may also be designed for feedback, in order to feed excess energy back to the grid, such as has been generated for example by the generator mode of the linear motor drive system during the braking of a vehicle. On the other hand, an active rectifier also allows a regulating of the intermediate circuit voltage. Not only can this be maintained stable, but also a somewhat higher voltage level can be achieved, which has a positive impact on the reduction of the acceleration distance.

Usually the feed unit is connected across a transformer to the power grid. In most instances, the power grid is a low-voltage or medium-voltage rotary-phase power grid. The transformer serves for the galvanic separation of the linear motor drive system from the power grid as well as for adapting the voltage amplitude to the permissible feed voltage of the feed module.

Alternatively, the energy transformers may also have an integrated feed unit or be designed as direct converters, so that the power supply bus and a separate feed unit can be eliminated.

Direct converters are capable of feedback and have a greater efficiency when the vehicle is moving at constant speed, when the input and output frequency are the same.

Preferably, the energy transformers of the linear motor drive system according to the invention are arranged distributed along the acceleration section. Thanks to the distributing of the energy transformers along the acceleration section, the wiring expense can be reduced. This holds in particular when the energy transformers are connected across a two-strand power supply bus. In this context the energy transformers are arranged as close as possible to the stator groups.

Thanks to the distributing of the energy transformers along the acceleration stretch, the space requirement for a central electrical room becomes smaller. In large layouts, sufficient room is often available near the travel route to accommodate the inverters. Furthermore, thanks to shorter cables the power losses and electromagnetic perturbations are decreased. The energy transformers may additionally be provided with sensor inputs for the connecting of sensors. Thanks to the arrangement of the energy transformers in proximity to the stator groups the sensor cables can also consequently be shortened and thus perturbing factors can be reduced. The energy transformers may be interconnected by a digital bus system, so that the simplest possible data exchange is made possible. In certain instances, however, it may be advantageous to accommodate the energy transformers in a central room or, for lack of space along the travel route, to place them at a distance from the latter.

In a particular embodiment the energy transformers are integrated in the stator groups, making possible an especially simple layout of the drive system.

In another preferred embodiment the linear motor drive system according to the invention comprises an energy accumulator which is connected to the power supply bus. The energy accumulator makes it possible to reduce the maximum feed power or feedback power to or from the power grid. The energy accumulator preferably comprises at least one battery. The energy accumulator in particular is capable of reducing power peaks during the feeding or feeding back of energy to or from the power grid, since the linear motor drive system during the accelerating of the vehicle to a higher speed can draw a substantial portion of the energy from the energy accumulator and during the braking to a lower speed it can feed energy back into the energy accumulator.

In this way, the installed load of the overall layout can be reduced. In an optimal manner, the energy accumulator can take up and put out the entire energy needed for a movement cycle of the vehicle.

The energy needed for a movement cycle may comprise, besides the kinetic energy needed for the acceleration of the vehicle, also the potential energy needed to overcome a height profile or other conservative forces, such as a spring force. If the entire kinetic as well as potential energy of the vehicle can be stored in the energy accumulator, then only the loss power still needs to be drawn from the power grid.

In many cases, however, it is sufficient for the drive system to have feedback capability, especially when the installed load is low. In this case, surplus energy freed up during braking processes is fed back to the power grid and not stored temporarily. Alternatively, a linear motor drive system is also possible in which the energy is neither stored temporarily nor fed back. This variant may be advantageous when the loss power is very large, so that a storing of the energy or a feeding of the energy back into the grid is not advisable for technical and/or economic reasons.

In an especially preferred embodiment, the energy accumulator is realized by battery modules. With battery modules a high power density can be achieved with low costs at the same time. The battery modules are preferably outfitted with quick-charging lithium ion batteries. In order to achieve a rapid charging and discharging, as well as a long lifetime, the batteries are preferably only discharged by no more than around 5% of their overall capacity, and in an even more preferable manner by no more than around 1% of their overall capacity. The battery modules have a very large storage capacity and may have a very long lifetime of, for example, up to around 20 years. At the same time, they enable a long storage of the energy, for example, even when there are lengthy intermissions in the operation of a layout. In particular, battery modules can be connected across a direct DC-DC converter to the d.c. voltage bus, which requires no voltage reduction, for example from 1000 V to 500 V. However, other energy accumulators may also be used, such as supercaps or flywheels, both of which also enable a high power density.

In another preferred embodiment the energy transformers are inverters, preferably designed as multiphase inverters. An inverter generates an alternating voltage from a d.c. voltage or an alternating current of variable frequency and amplitude from a direct current.

The multiphase inverters are preferably designed as two or three-phase inverters, which generate a two-phase or multiphase alternating voltage from a direct current or d.c. voltage, especially a two-phase or a three-phase alternating voltage.

Depending on the stator type, the inverter may generate a sinusoidal output current or a block-shaped output current. For example, a block-commutated output current may be advantageous for the operation of an electronically commutated stator. However, the drawbacks of a block-commutated output current are a greater force ripple as compared to the sinusoidal commutated current and accordingly also increased noise production. However, other forms of current are also conceivable.

One preferred embodiment calls for the use of multiphase inverters, comprising a single-phase inverter for each phase. The multiphase quality is achieved by the phase-offset actuation of the single-phase inverters. Each of these single-phase inverters has an output with two leads, between which one phase of a stator group can be connected, while the phases of the stator groups are galvanically isolated from each other. This ensures that the motor can be operated with a lower intermediate circuit voltage than is the case with a concatenation of the output voltage, when the motor is operated with a conventional multiphase inverter. A single-phase converter can be realized by two parallel half-bridges (twin circuit), which are actuated with a 180° offset from each other.

Preferably, insulated-gate bipolar transistors (IGBT) are used as switches in the inverters, since these make possible an efficient regulating of the load current. Meanwhile, however, other switches can also be used, such as high-voltage power MOSFET (metal-oxide-semiconductor field-effect transistor) switches. Preferably, semiconductor switches based on silicon (Si), silicon carbide (SiC) and gallium arsenide (GaAs) will be used.

Alternatively the energy transformer may also be, for example, a d.c. transformer, for example if a mechanical commutation is used. However, it is also possible to use frequency converters or direct converters as the energy transformer, which can be connected directly to a power grid or across a transformer to a power grid.

Especially preferably, low-voltage inverters are used, preferably low-voltage inverters which are designed for the same power. Low-voltage inverters are significantly more favorable and safer than inverters which work with higher voltage, such as medium-voltage inverters. In addition, the safety expense is much lower when using low-voltage inverters: the cost outlay can be reduced and at the same time a higher power density, and thus a shorter acceleration distance, can be realized.

Low-voltage inverters means inverters with an interlinked alternating voltage effective value of at most 1000 V or a maximum d.c. voltage of at most 1500 V. By limiting the design to low-voltage components, the operation and maintenance of the linear motor drive system are simplified, since no special training and fewer costly special instruments are required.

Furthermore, thanks to the use of low-voltage inverters of the same power a simple scaling of a layout is possible. This also makes it possible to lower the procurement, manufacturing, and also maintenance costs.

However, it is also possible to adapt individual stator groups and/or the associated converters to specific requirements of a specific segment of the acceleration section of a travel route. For example, a stator group at the start of an acceleration section where the speed of the vehicle is still low must produce large forces, but low powers. The stator elements of such a stator group may therefore comprise stator windings having a higher turn count and therefore being able to generate the propulsive force with a lower motor current than stator groups in a region where the vehicle is moving at maximum speed. Thus, it might be advantageous to adapt the stator windings and the energy transformers to the speed of a track section. However, it might also be advantageous to adapt only the number of stator elements of a stator group of a track section to the power of the inverter, so that only inverters of the same power can be used. On track sections with lower speeds and less required power, the number of stator elements of a stator group may be chosen to be larger than in regions where a high speed and/or a high power is required. The stator elements of such track sections may be connected in series in order to better utilize the available voltage of the connected energy transformers. On the other hand, it is also possible, in regions of higher speed or higher power, to reduce the number of stator elements of a stator group. However, it is also possible to adapt both the stator windings or turn count and the number of stator elements of a stator group to the particular track section and the particular power and/or speed required in this track section. For example, in a track section where a low speed and/or low power is required, the stator windings of the stator elements may be designed for a high voltage constant or be wound with a high turn count. Since the required motor current and the required power for the operation of such a stator element is less, consequently more of these stator elements may be connected in parallel to form a stator group and be operated by an energy transformer which can be designed for the same power as that of the other track sections.

Consequently, the energy transformers can be adapted to a corresponding track section in order to reduce costs or also save on energy. On the other hand, however, the stator groups or stator elements may also be adapted to a corresponding track section, especially the number of stator elements per stator group. Of course, it is also possible to combine the design power of the individual energy transformers, the number of stator elements per stator group, the wiring of the stator elements within a stator group and the nature of the stator elements, especially the windings, in dependence on a track section of the travel route and the corresponding desired acceleration or movement profile.

In another especially preferred embodiment of the linear motor drive system, the stator is liquid cooled in order to increase the acceleration of the vehicle.

Thanks to the combination of decentralized driving topology and liquid cooling of the stator, a high power density may be achieved, which makes it possible to still generate a large force even at high speeds of the vehicle. In this way, the acceleration distance can be further shortened. In one preferred embodiment, water is used as the cooling liquid on account of its high thermal capacity, but other cooling liquids may also be used, such as cooling oil. The latter requires no corrosion protection measures and is not electrically conductive, which is an advantage in the event of leakage. The cooling liquid is preferably cooled via a heat exchanger to a given temperature or a temperature in relation to the ambient temperature. If needed, a cooling of the stator largely independent of the ambient temperature may be accomplished, which is not possible for example in the case of a forced cooling with ambient air through fans.

In another especially preferred embodiment of the invention, the stator elements comprise at least one first carrier plate made from an electrically nonconductive material and a stator winding with at least one flat coil which is arranged and potted in a recess of the first carrier plate. Furthermore, the stator comprises for the liquid cooling at least one cooling element with a sheetlike cooling housing made from a nonmetallic material. The carrier plate of the stator element is connected in a sheetlike manner to a first side surface of the cooling housing, so that an outer side surface of the flat coil in relation to the recess is directly adjacent to the cooling housing.

Thanks to the use of an electrically nonconductive material for the carrier plate, reluctance effects between the stator and the rotor are minimized and a cogging torque is avoided. In this way, neither does the force ripple occur which is attributable to the cogging torque. Likewise, the magnetic attraction between stator and rotor is reduced and position-dependent transverse forces are avoided, such as result for example from a nonconstant air gap between stator and rotor along the travel route.

The construction of this preferred embodiment allows an extremely flat design and an efficient cooling. Furthermore, it enables a modular design and simple installation. Thanks to the use of a nonmetallic material for the cooling housing, no special measures need to be taken to suppress eddy current losses. Preferably the housing consists of a similar material to the carrier plate of the stator element. In this way, the cooling housing also has similar thermal qualities, so that thermal distortions and stresses between the carrier plate and the cooling housing are avoided. At the same time, the cooling housing can mechanically strengthen the stator structure and thus contributes to the rigidity of the system. Due to the direct proximity of the cooling housing to the external side surfaces of the flat coils arranged in the recesses in the carrier plate, the heat of the windings can be easily dissipated.

The at least one flat coil is advantageously potted in the recesses.

The potting of the flat coils is done advantageously with an epoxy resin. Thanks to the potting, the flat coils take on additional stability, especially with regard to the deformation and shifting of the flat coils. An epoxy resin with good thermal conductivity can likewise be used in order to better dissipate the heat. The potting of the recesses may also be done after mounting the cooling housing, in which case the cooling housing is connected at the same time to the nonmetallic carrier plate by the potting.

Thanks to the flat construction, the cooling element may have a layered composition, wherein the cooling ducts may be worked into the plates over a large area.

Alternatively, cooling ducts may be integrated directly in the carrier plate of the stator housing, for example, by drilling of cooling ducts or inserting of tubes in recesses of the stator housing, followed by potting them with epoxy resin, preferably during the potting of the stator windings. The tubes may be either plastic or metallic, such as copper or aluminum or a preferably stainless steel alloy.

In another preferred embodiment, the stator winding of the stator element is multiphase and the stator element comprises at least one flat coil per phase. Said flat coils are arranged alongside each other, parallel to the travel route, in recesses of the first carrier plate and define a first row of coils, so that the outer side surfaces of said flat coils of the first row of coils, relative to the recesses, lie in the same plane and are directly adjacent to the cooling housing.

However, it is also possible to distribute the individual phases over several stator elements. In particular, one stator element may be provided for each phase. In this way, a very high flexibility can be achieved in the switching or the combination of the individual stator elements, even when standardized stator elements are used.

A multiphase winding enables an efficient operation of the linear motor drive system with inverters, especially as a permanently excited synchronous machine or as an asynchronous machine. The arrangement of the flat coils alongside each other parallel to the travel route in a row in recesses enables an extremely flat construction of the stator, a simple fabrication, as well as a simplified installation. Thanks to the flat construction, a small air gap can be realized and stray magnetic fields and thus losses can be minimized. In general, flat coils may also be arranged overlapping and/or the winding axis may have an angle which differs from an angle which is directed perpendicular to the travel route.

In another preferred embodiment, the stator element of the linear motor drive system according to the invention comprises a second carrier plate made from electrically nonconductive material and a stator winding with at least one flat coil, which is arranged in a recess of the second carrier plate. The second carrier plate is connected in a sheetlike manner to a second side surface of the cooling housing, so that an outer side surface of the flat coil of the second carrier plate, in relation to the recess, is directly adjacent to the cooling housing.

Thanks to the sandwich design of two carrier plates enclosing the cooling housing, a very rigid and especially a symmetrical construction can be achieved. At the same time, the cooling element can dissipate heat on both sides, which heightens the cooling effect. It is also possible for the second carrier plate to be arranged on the free side surface of the first carrier plate, i.e., on that side surface of the first carrier plate which is opposite the cooling plate. In this embodiment, a second cooling plate with a cooling housing may be arranged on the side surface of the second carrier plate not adjacent to the first carrier plate, such that the external side surface of the flat coil of the second carrier plate, relative to the recess, is directly adjacent to the cooling housing of the second cooling plate. Thanks to this arrangement, the heat of the stator element is dissipated on both sides, so that the stator is encapsulated in heat engineering terms.

In an especially preferred embodiment of the invention, several flat coils of the multiphase stator winding are arranged alongside each other parallel to the travel route in recesses of the second carrier plate. These several flat coils define a second row of coils. The outside side surfaces of the flat coils of the second row of coils, in relation to the recesses, lie in the same plane and are directly adjacent to the second side of the cooling housing. Thus, the cooling plate can be arranged in the middle between two rows of stators. Thanks to this arrangement, the cooling plate can dissipate heat from the stator on both sides, while the heat dissipation may occur in the middle of the stator winding, where the largest heat output is to be expected. Thanks to the two-row arrangement, furthermore, a symmetrical stator layout in relation to the cooling plate is made possible. The first and second row of coils are preferably designed to be identical and are oriented parallel to each other, so that they substantially contribute in equal measure to the magnetic field generated by the stator. In this way, an especially favorable force generation is achieved, being largely free of transverse forces. Likewise, a symmetrical distribution of heat in the stator plate is achieved and heat distortions in the direction of the air gap of the linear motor are minimized. The symmetrical layout is also advantageous for increasing the system rigidity.

In another preferred embodiment of the linear motor drive system, the cooling elements are metal-free. Thanks to the use of a metal-free cooling, eddy current losses are prevented in the cooling elements. Furthermore, there is no risk of corrosion when using water as the coolant. A metal-free cooling element at the same time works as an electrical insulator, meaning it can border directly on the flat coils of the stator with no further electrical insulation layer.

Alternatively, however, metal-containing cooling elements can also be used, which however should be iron-free or nonmagnetic, like the carrier plates of the stator housing. The cooling elements for example may comprise a metallic housing of aluminum or titanium or also a nonmetallic housing, such as one made of plastic, which is supplemented with metallic parts for carrying the liquid, such as metallic tubes or metallic foils. One may also use plastic housings with metal particles for improved thermal conductivity. However, one should avoid large continuous and electrically conductive surfaces perpendicular to the magnetic field, in order to reduce eddy current losses. This may be accomplished, for example, by powder metallurgy production (sintering) of the metallic cooling bodies or also by making slots in metal plates.

In addition, an embodiment is also preferable in which the metal-free cooling element is monolithic. A monolithic cooling element means a cooling element with a cooling housing which is made from a single material. In this way, no sealing work is necessary. The cooling housing may be produced for example by an additive method (3D printing) or by welding of two plates of a similar or identical material. In particular, it may be a cooling housing made of plastic. Connection pieces may also be integrated in the monolithic cooling element for the connection of cooling lines. Preferably each cooling element has at least one connection for an inlet and one connection for an outlet of cooling liquid.

An embodiment of the linear motor drive system is preferable in which a sensor module is arranged at least between two consecutive stator elements in the route direction and wherein the sensor modules serve for determining the absolute position and the speed of the rotor. In a particular embodiment, one sensor module is arranged between every stator element. There should be arranged at least as many sensor modules so that in every position of the rotor along the acceleration stretch at least one sensor module can detect the position of the vehicle or of the rotor. Measurement errors can be reduced by a simultaneous evaluation of several sensor modules. The measurement errors of a sensor module may be attributable for example to a faulty installation or orientation of the sensor module, an imprecise orientation of the rotor, or the measurement inaccuracy of the sensor module itself. A good signal quality is especially necessary when the velocity also needs to be determined from the position signal, for example by differentiation. In the case of a permanently excited rotor, the sensor module preferably comprises a Hall sensor for detecting the rotor magnetic field, by which the position of the pole division can be ascertained directly. However, other sensors may also be used for determining the magnetic field of the rotor, such as magnetoresistive sensors.

By arranging the sensor modules between the stator elements, the available space of the linear motor drive system can be optimized and the installation simplified. No special orientation of the sensor modules is necessary, since their position with respect to the stator is defined.

Instead of or in addition to the determination of the magnetic field of the rotor, however, the position of the rotor or that of the vehicle may also be obtained with reference points on the vehicle or reference marks or reference divisions arranged on the vehicle, making possible a position determination by a sensor integrated in the sensor module. Magnetically or inductively operating sensors are preferably used here, since these are resistant to dirt and maintenance-free, but optical, radio, or mechanical systems are also possible. On the other hand, the sensor may also be integrated in the vehicle and the reference division or the reference marks arranged on the roadway.

In an additional preferred embodiment of the linear motor drive system, the flat coils have central openings in which iron cores are placed, consisting preferably of a sintered ferromagnetic material. The iron cores can concentrate the magnetic field and thus increase the power density. The iron cores can be potted together with the flat coils. Eddy current losses can be reduced by the use of sintered ferromagnetic iron cores.

Segmented or laminated iron cores may also be used to reduce eddy current losses.

In another preferred embodiment of the invention, the carrier plates are made of fiber-reinforced plastic, especially fiberglass-reinforced plastic. In another embodiment, the carrier plate is made from a carbon fiber-reinforced plastic. The use of fiber-reinforced plastic enables a very mechanically stable and rigid construction. However, other electrically insulating materials may also be used for the carrier plates, such as ceramics, synthetic resin, and PTFE (Teflon).

Also preferred is an embodiment of the invention in which each cooling element is matched up with a stator element. In particular, this simplifies the installation, since the cooling elements together with the stator elements can form a module which can be arranged on the travel track.

However, it may also be advantageous to assign to each stator group exactly one cooling element, so that the stator groups may be treated as modules. Likewise, a stator element may also be matched up with several cooling elements, preferably an integer number, so that once again the stator element with the integer number of cooling elements may be treated as a module. For example, it may be necessary to have additional connections for the supplying of coolant, either to increase the flow rate of cooling liquid or to keep the temperature gradient in the stator as low as possible. In this case, it is advantageous to match up each stator element with several cooling elements, each one having an inlet and an outlet for the coolant. Likewise, it may be advantageous to match up each cooling element with an integer number of stator elements. However, it is also conceivable to provide a single cooling element, on which all stator elements are arranged. Each time one cooling unit may be matched up with one cooling element. However, in many cases it is advisable to assemble several cooling units into a cooling element group and to supply the cooling element group with the cooling liquid by a common cooling unit. Among the limiting factors for the possible number of cooling elements per cooling element group are the pressure drop in the lines, the heat being dissipated, but also the height difference which needs to be overcome.

In an especially preferred embodiment of the invention, the rotor comprises a magnetic arrangement with permanent magnets. The use of a rotor with permanent magnets allows the linear motor drive system to operate as a synchronous linear motor, an electronically commutated or a mechanically commutated linear motor. In particular, an operation as a synchronous linear motor is advantageous, since this enables very large propulsive forces with a good efficiency, but at the same time it can also be designed for a very slight force ripple. A force ripple means the position-dependent variation in the propulsive force generated by the linear motor drive system. Advantageously, permanent magnets made from rare earth elements such as samarium-cobalt and neodymium-boron are used, since these possess a high magnetic field strength. Instead of a rotor with permanent magnets, however, it is also possible to use a squirrel cage rotor or reluctance rotor, which are economical in their procurement. When the rotor is designed as a squirrel cage rotor, the linear motor may be operated by a multiphase stator as an asynchronous linear motor; in the case of a reluctance rotor, it may also be operated as a reluctance motor. The latter configurations have the advantage of no investment costs for the permanent magnets. The use of a squirrel cage rotor together with a multiphase stator as an asynchronous linear motor also enables an operation with a slight force ripple and is also very good for operation at amusement parks. In addition, the precise position of the rotor does not necessarily need to be known in asynchronous motors for the generating of the propulsive force, as is the case in synchronous motors, in which the pole position of the magnets must be known for their operation.

In another preferred embodiment, the magnetic arrangement comprises two parallel rows of magnets, whose poles of opposite polarity stand opposite each other and which surround the stator on both sides along their length. Thanks to the two-row arrangement, the forces of attraction between the rotor and the stator are compensated, so that the driven vehicle and the travel route need absorb little or no forces transversely to the travel direction, such as result directly from the interaction between stator and rotor, but instead only forces caused by the acceleration or movement of the vehicle. The two rows of magnets also generate a greater magnetic induction, which further increases the power density. In particular, however, this arrangement makes possible a parallel construction of the linear motor drive system, which also reduces the dynamic transverse forces.

According to the invention, the linear motor drive system is used for the acceleration of a vehicle on a travel route for passenger transportation in an amusement park. Thanks to the possibility of accelerating to a high speed on an extremely short track, economically affordable amusement parks can be realized which attain much higher speeds as compared to the prior art and thus create even more thrills and enjoyment. Furthermore, the linear motor drive system according to the invention is especially suitable for this use, since it assures a good reliability on account of its redundancy, but at the same time is also very maintenance-friendly on account of the absence of wear in its noncontact drive system and the easily replaceable system components. Another benefit is that an amusement park which can be operated in a very energy-favorable manner can be realized thanks to the use of the linear motor drive system according to the invention.

In another form of use according to the invention the linear motor drive system according to the invention is used for the acceleration of a drilling device in a drilling rig.

At present, borehole depths of more than 3000 m are achieved, while the boreholes themselves are sometimes situated deeper than 4000 m beneath the sea floor. The drilling rigs themselves are sometimes over one hundred meters tall. The drilling device of a drilling rig comprises, besides the drill bit, a drilling column, which is composed of a certain number of drilling rods. For a drilling, the entire drilling device, i.e., the drill bit together with the entire drilling column, must be transported downward by means of the vehicle of the linear motor drive system, and it must also be transported upward once more for a drill bit replacement or to remove samples. The inserting or the removing of the drilling rods which is necessary for this is very time intensive on account of the long travel distances as well as the highly accelerated masses Prior to inserting a drilling rod, the vehicle of the linear motor drive system must be driven into an upper position each time, so that the drilling rod can be installed and then moved downward together with the entire drilling device. The upward travel movement, prior to the replacement of a new drilling rod, occurs without the drilling column, meaning that the acceleration ability of the linear motor drive system without drilling column up to a maximum velocity has a major influence on the process time. On the other hand, before removing a drilling rod the vehicle on which the drilling column is located must be able to move up to the upper position as fast as possible, for which once again a large propulsive force is needed, and this time when the complete drilling device is mounted on the vehicle. Thanks to the use of the linear motor system according to the invention in drilling rigs, very high accelerations and velocities of the drilling device are possible, with the results that the secondary process time of the drilling can be significantly reduced. A further benefit of the use of the linear motor drive system according to the invention is that the drive system functions free of wear.

Alternatively, winch-based drive systems can be used for the acceleration or movement of the drilling device, in which the drilling device is suspended from a wire cable, which is wound or unwound onto a cable drum, so that the drilling device is raised or lowered. A large portion of the driving torque in this case is used to accelerate the cable drum.

In a preferred embodiment, the linear motor drive system is used for a ship-based drilling rig. Ship-based drilling rigs mean here in the broader sense drilling rigs which are found on the water and not firmly connected to the ground, i.e., they are subject to wave action and/or the tides. In this sense, for example, drilling rigs on floating oil platforms are also counted among the ship-based drilling rigs. A ship-based drilling rig is consequently subject to wave action, which raises and lowers the ship with the drilling rig relative to the sea floor, river bed, or lake bottom. The drilling column with the drill bit, however, should not participate in this motion relative to the sea floor. This relative motion can be balanced out by the linear motor drive system according to the invention by producing an acceleration of the vehicle on which the drilling device is secured contrary to the movement of the ship. Consequently, the car moves relative to the drilling rig, which defines the travel route.

Thanks to the linear motor drive system according to the invention, the wave action can be balanced out in order to achieve an optimal drilling pressure with the drilling device and especially to avoid a breakage of the drilling device. Such a lift compensation can also be realized with a winch-based system, but thanks to the use of the linear motor drive system according to the invention a more precise compensation is possible, since the system according to the invention can be regulated much more dynamically and precisely. Neither does the inertia of a cable drum need to be overcome.

The movement to balance out the wave action produces a continual accelerating and braking of the vehicle: the energy required or produced each time can be stored temporarily in an energy accumulator, so that only a slight energy consumption arises on account of the compensation movement.

Summarizing, the invention on the one hand contains the aspect of a decentralized drive topology as claimed in claims 1-6, and on the other hand the aspect of the flat stator design with integrated liquid cooling as claimed in claims 7-13. The two aspects taken together enable an especially high acceleration of the vehicle along the travel route. However, it is also possible to realize the two aspects independently of each other and to use linear motor drive systems corresponding to both aspects separately from each other in the forms of use according to the invention as claimed in claims 14 and 15.

Further advantageous embodiments and combinations of features of the invention will emerge from the following detailed description and the totality of the patent claims.

BRIEF DESCRIPTION OF THE DRAWINGS

The drawings used to explain the exemplary embodiment show.

Basically, the same parts in the figures are given the same reference numbers.

WAYS OF IMPLEMENTING THE INVENTION

Figure 1:
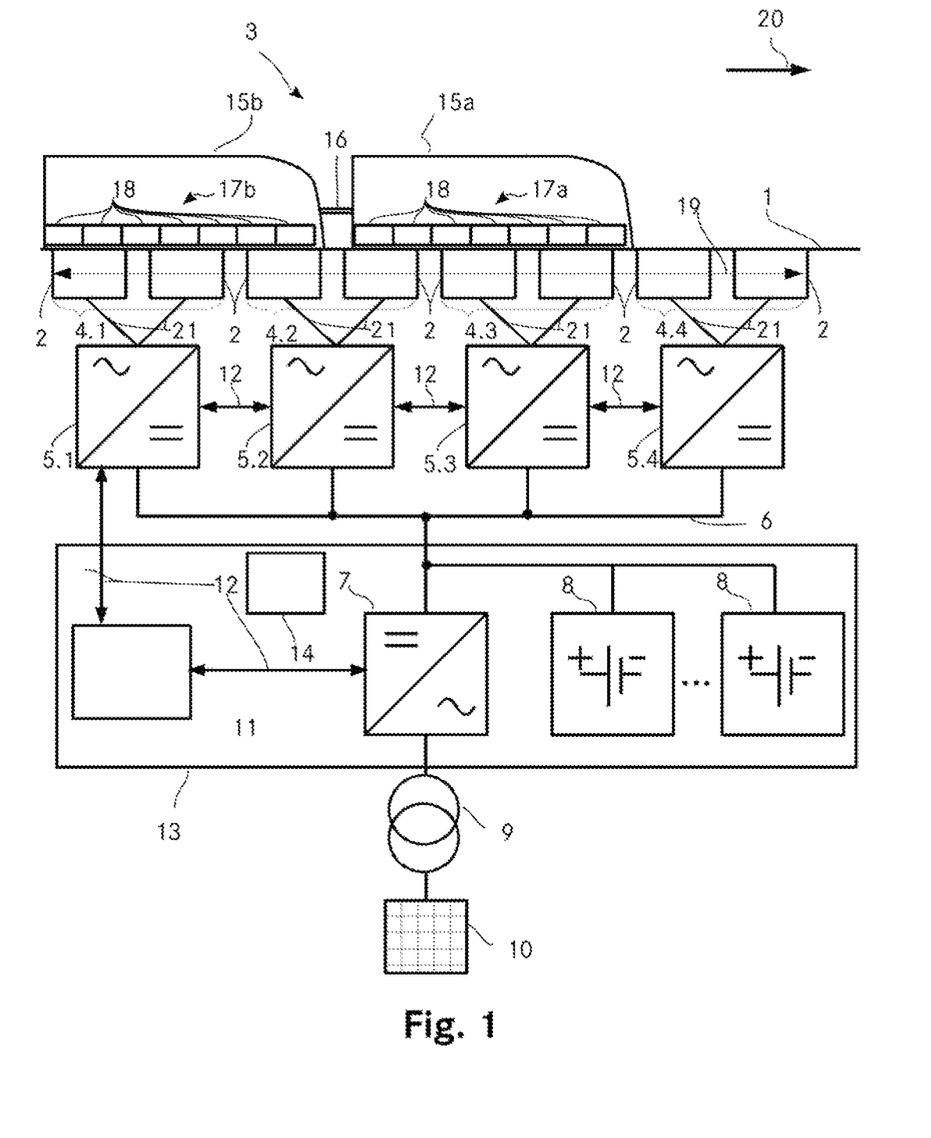
FIG. 1 Simplified schematic representation of one embodiment of the linear motor drive system according to the invention.

FIG. 1 shows one possible embodiment of the invention. It shows a travel route 1, along which stator elements 2 are arranged. On the travel route 1 a vehicle 3 is mounted, able to move along the travel route 1, for example by a system of rollers and rails. Two stator elements 2 alongside each other are assembled each time to form a stator group 4.1, 4.2, 4.3, 4.4, each of which is permanently connected to an inverter 5.1, 5.2, 5.3, 5.4. The stator elements 2 depicted each comprise stator windings of all three phases of the three-phase rotary current system.

The stator elements 2 of each stator group 4.1, 4.2, 4.3, 4.4 are connected in series. The stator groups 4.1, 4.2, 4.3, 4.4 are connected to the permanently connected inverters 4.1, 4.2, 4.3, 4.4, across two three-strand connections 21 each time, since one output and one input is provided for each of the three phases.

The respective input and output strand of a phase is connected each time to the two leads of one of a total of three single-phase inverters, comprised by each of the inverters 5.1, 5.2, 5.3, 5.4. The benefit of this circuit arrangement is a lower terminal voltage on the motor phases. However, the stator groups 4.1, 4.2, 4.3, 4.4 may also be connected by a conventional triangle or star circuit to the respective frequency converter, in which case the output stage of the frequency converter may then comprise a conventional B6 bridge. In this case, the stator group requires only one connection strand per phase, possibly in addition to an optional connection strand for connecting a possible star point.

The total of four inverters 5.1-5.4 of the exemplary embodiment of FIG. 1 are connected by their d.c. voltage input to a common two-strand voltage intermediate circuit 6 (only shown symbolically). The d.c. intermediate circuit 6 is also connected to the d.c. voltage output of a feed unit 7, which comprises an active rectifier, and to several battery storage modules 8. The d.c. intermediate circuit 6 in this example is designed for an intermediate circuit voltage in the low-voltage range (up to max. 1500 V). The feed unit is connected at its input side across a transformer 9 to a public rotary-phase power grid 10, in which the transformer 9 steps down the medium voltage of the rotary-phase power grid to a low voltage (up to max. 1000 V). The exemplary embodiment according to the invention furthermore comprises a central control unit 11, which takes on the control of the vehicle 3. For this, it is connected to the individual inverters 5.1, 5.2, 5.3, 5.4, which it actuates in dependence on the actual position and actual velocity or the nominal position and/or nominal velocity of the vehicle 3. The detecting of the actual position is done by means of Hall sensor modules (not shown), which are positioned between the stator elements and which can detect the absolute pole position of the permanent magnets on the vehicle 3. They likewise enable a determining of the velocity of the vehicle 3 by the differentiation of the positional information. Especially in the case of the synchronous motor, the position of the magnet poles of the vehicle 3 in relation to the stator windings is required in order to apply the currents in proper phase in the stator windings. In the example, the central control unit 11 is connected across a field bus 12 to the individual inverters 5.1-5.4 and to the feed unit 7. The Hall sensors are connected directly to the inverters, which transmit the sensor signals via the field bus 12 to the central control unit 11. However, the Hall sensors may also be connected directly to the central control unit 11. The feed unit 7, the central control unit 11 and the battery module 8 are accommodated in a central control cabinet 13, while the stator elements 2, the Hall sensor modules and the inverters 5.1-5.4 are arranged on the travel route 1. In this way, the central control cabinet 13 can be maintained very small. The central control unit 13 furthermore contains a cooling assembly 14 for the water cooling of the stator elements 2. The cooling lines required for the water cooling are not shown in FIG. 1 for reasons of clarity.

The vehicle 3 comprises a first car 15a and a second car 15b, which are joined to each other across a universal joint 16, so that the distance between the two cars in the travel route direction also remains constant during travel. On the vehicle 3 is disposed a permanent magnetic arrangement consisting of a first permanent magnet row 17a and a second permanent magnet row 17b, the first permanent magnet row 17a of seven permanent magnet basic modules 18 being arranged on the first car of the vehicle and the second permanent magnet row 17b of another seven permanent magnet basic modules 18 being arranged on the second car 15b. A permanent magnet basic module 18 has one north pole and one south pole in the travel route direction 20. The permanent magnet basic elements 18 are arranged so that the magnet poles alternate in the travel route direction 20, the pole division corresponding to half the width of a permanent magnet basic module. The permanent magnet basic modules 18 comprise, for example, permanent magnets arranged in parallel in two rows, whose poles of opposite polarity each time stand opposite each other and which surround the stator on both sides along their length. However, a single-row arrangement can also be used. The universal joint ensures that the distance in the travel route direction between the first permanent magnet row 17a and the second permanent magnet row 17b remains constant during travel, even under load, while the distance between the first permanent magnet row 17a and the second permanent magnet row 17b corresponds to precisely one pole division in the example.

In the exemplary embodiment, the rotor or the permanent magnetic arrangement consisting of the two permanent magnet rows 17a, 17b is located in the effective region of the first stator group 4.1, the second stator group 4.2 and the third stator group 4.3, which are all activated and contributing to the propulsion, while the fourth stator group 4.4 is not yet activated, but will soon be activated in the immediate future. Now, it is assumed that the vehicle is coming from the travel route direction 20 and entering the effective region. Since at the start of the entry of the vehicle 3 or the rotor into the effective region of the stator 19 at first only the front car 15a with its permanent magnet row 17a is located in the effective region of the stator, in the beginning only the first stator group 4.1 is supplied with energy across the inverter 5.1. Successively with the continued movement of the vehicle in the travel route direction the individual stator groups 4.2-4.4 are likewise activated by the corresponding inverters 5.1-5.4, until the last car of the vehicle once more exits from the effective region of the first stator group 4.1 and thus the first stator group 4.1 is deactivated. Depending on the position of the vehicle, 1-4 inverters are accordingly active and supply the vehicle 3 with energy.

In FIG. 1, for better visibility, the permanent magnet basic modules 18 and the stators are represented such that they are separated by an air gap which lies in a plane which runs parallel to the roadway and perpendicular to the plane of the drawing. However, arrangements are also possible in which the air gap lies in a plane or several air gaps lie in several planes parallel to the plane of the drawing.

Likewise for better representation in FIG. 1 a short stator has been chosen; the stator groups in FIG. 1 for the same reason are composed of only two stator elements. Longer stators composed of significantly more stator elements are typical for amusement parks. Especially preferred are stators with lengths of around 20 m to 150 m, which are composed of several stator elements of the same size, for example, stator elements with a length of 0.7 m and a height of 0.3 m. The stator elements are mounted at a distance of 0.1 m from each other in the travel route direction, so that a stator element is found every 0.8 m of the travel route. A stator group is typically composed of 3-6 stator elements, whose flat coils are connected in series. However, in many cases a parallel connection between the stator elements of a group may be advantageous. The free space between the stator elements is used for the mounting of the sensor modules. With typically 3-6 stator elements per stator group, one stator group is mounted every 2.4 m-4.8 m along the travel track.

In the following drawings, the same or similar elements of different embodiments are indicated by similar reference numbers, differing by their hundreds digit if represented in different drawings.

Figure 2:
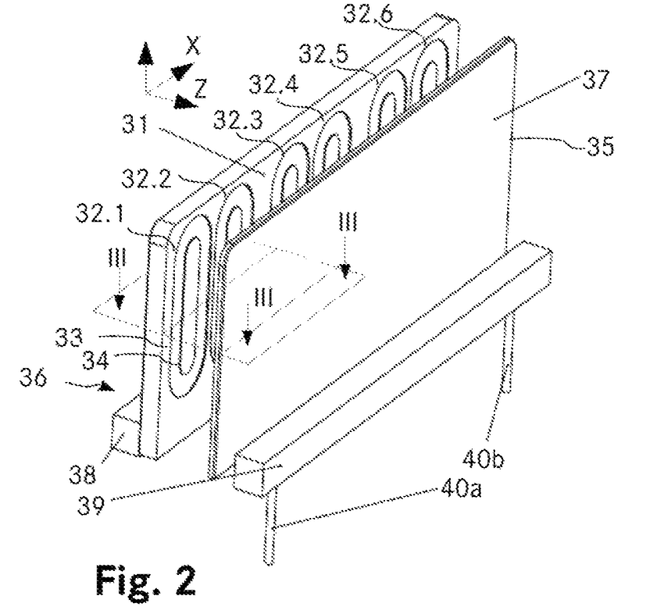
FIG. 2 Simplified exploded representation of an arrangement of a three-phase stator element with a cooling element according to the invention.

FIG. 2 shows in the form of an exploded drawing a simplified representation of an arrangement according to the invention of a three-phase stator element and a cooling element. To designate the axial directions, a Cartesian coordinate system with X, Y, Z coordinate axes is used. The X-axis points in the direction of the travel route or the positive propulsion direction. An acceleration of the vehicle or a force in this direction accordingly also has a positive sign. The Y-axis represents the height axis and is oriented perpendicular to the travel route, i.e., in a horizontally extending travel route it points opposite the direction of the earth's gravity. The Z-axis is accordingly oriented transversely to the travel route.

The stator element comprises a carrier plate 31 with a rectangular base surface, whose long side runs in the direction of the X-axis and whose short side runs in the direction of the Y-axis. The thickness of the plate is determined by its extension in the Z-direction. The carrier plate 31 has 6 annular recesses 32.1-32.6, whose respective outer contour 33 and inner contour 34 each possess a basic oval shape, composed of two straight lines and two semicircles. The recesses 32.1-32.6 are milled in the carrier plate 31 made from fiberglass-reinforced plastic (GFK). The 6 recesses 32.1-32.6 are grouped into three pairs of neighboring recesses, the neighboring recesses bordering each other with two straight long sides of their oval outer contours 34. The groups are distributed over the carrier plate 31 in the X-direction or the direction of the travel route: the two recesses 31.1 and 31.2 of the first pair accommodate in each case flat coils of a first phase U, the recesses 31.3 and 31.4 of the second pair accommodate the flat coils of a second phase V, while recesses 31.5 and 31.6 of the third pair accommodate in each case the flat coils of a third phase W. In the exemplary embodiment, each time two flat coils are stacked one above the other for each recess. The flat coils themselves each have a central opening at the middle, which lies against the inner contour 34 of the respective recess 33.1-33.6. Between the central opening or inside the inner contour 34 of the recesses 32.1-32.6 an iron core may be inserted in another recess, an inner recess—not shown here—to concentrate the magnetic field. The recesses 32.1-32.6 instead of being annular may also be formed throughout with an oval base surface, bordered by the outer contour 33. The iron core may then be inserted directly into the central opening of the flat coils.

Also not represented in FIG. 2a are the channels in the carrier plate to accommodate the connection slots of the respective flat coils in the recesses 32.1-32.6.

A cooling element with a sheetlike cooling housing in the form of a cooling plate 35 is arranged on the stator element. The cooling plate 35 has the same base surface as the carrier plate 31 and is potted together with the flat coils, congruent to the carrier plate 31. On an outer side 36 of the carrier plate 31 and on the outside 37 of the cooling plate 35 there are provided in a lower region connection strips 38, 39 with a nearly square cross section. The connection strips 38, 39 extend over the entire length of the respective plates 31, 35. While the connection strip 38 of the carrier plate 31 serves exclusively for the fastening of the carrier plate 31 to the travel route, the connection strip 39 of the cooling plate 35 also serves for supplying of coolant. For this, the connection strip 39 of the cooling plate 35 has a coolant inlet 40a and a coolant outlet 40b. The coolant arrives through two opposite situated boreholes further forward in the travel route direction in the connection strip 38 and in the cooling plate 35 (neither of them visible), enters the cooling plate 35, and leaves the cooling plate 35 by two opposite situated boreholes further rearward in the travel route direction in the connection strip 38 and in the cooling plate 35 (likewise not visible).

Figure 3:
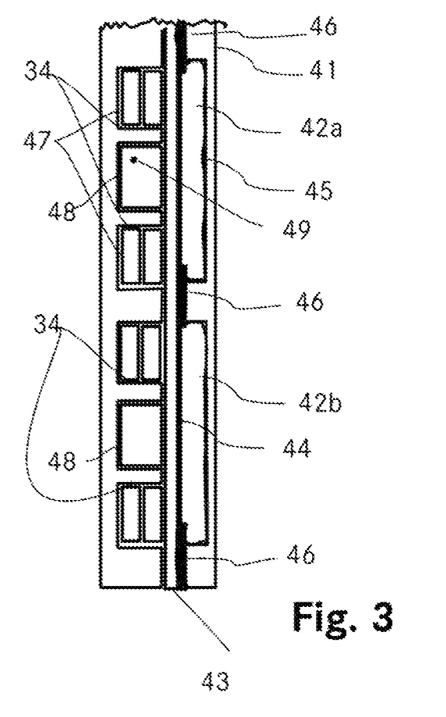
FIG. 3 Simplified schematic representation of cross section III of FIG. 2.

FIG. 3 shows a partial cross section III of the exploded view enlarged, illustrating the structure of the cooling plate 35 of the exemplary embodiment above.

The cooling plate 35 is composed of several layers: it comprises a base plate 41 in which the liquid channels 42a, 42b are milled, a cooling housing cover 43, which covers the cooling plate 35 and in the mounted state is arranged between the carrier plate 31 and a base plate 41 of the cooling plate 35. The base plate 41 and the cooling housing cover 41 define in the mounted state the shape of the liquid cooling ducts 42a, 42b of the cooling plate 35. Arranged as a water barrier on the inside of the cooling housing cover 43, for example by vapor deposition, is a water-tight layer 44. On the inside of the base plate 41 is arranged another water-tight layer, here in the form of a water-tight foil 45, for the sealing off of the liquid channels 42a, 42b against the base plate 41. An elastic, temperature-resistant adhesive 46, which is applied at contact sites between the water-tight foil 45 and the water-tight layer 44, serves for the fastening of the cover plate 43 to the base plate 41 and at the same time functions as a sealing of the cooling ducts 42a, 42b between the contact sites. The cooling ducts 42a, 42b are arranged opposite the flat coils of phase U, which lie in the recesses 32.1, 32.2 of the first pair (see FIG. 2). In the two recesses 32.1, 32.2 shown and also in the other recesses 32.3-32.6 which are not shown in FIG. 3, each time two flat coils 47 are arranged one above the other. Between the central openings of the flat coils 47 and inside the inner contours 34 of the recesses 32.1 and 32.2, each time further recesses 48 are arranged, in which iron cores 49 are installed for flux concentration. Both the flat coils 47 and the iron cores 49 are potted with an epoxy resin.

Figure 4:
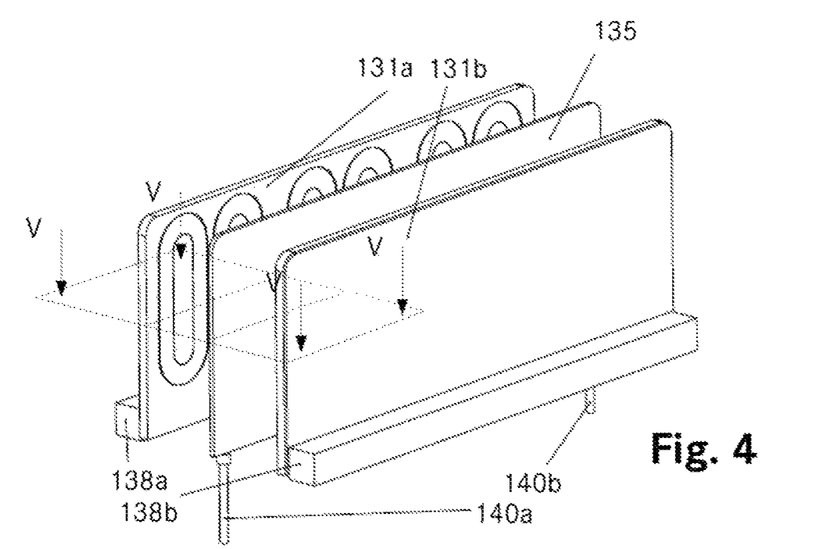
FIG. 4 Simplified exploded representation of another arrangement of a three-phase stator element with a cooling element according to the invention.

The exploded drawing of FIG. 4 shows a simplified representation of another arrangement according to the invention of a three-phase stator element and a cooling element with a sheetlike cooling housing in the form of a cooling plate 135. By contrast with the embodiment of FIG. 2, the stator element of FIG. 4 comprises a first carrier plate 131a and a second carrier plate 131b, which surround the cooling plate 135 like a sandwich. The two carrier plates 131a and 131b are arranged symmetrically to each other and correspond in structure to the carrier plate 31 of the exemplary embodiment above. Accordingly, the two carrier plates 131 once again each comprise six recesses 132.1-132.6, but in each recess only one flat coil is arranged, so that the recesses may be more shallow than in the previous exemplary embodiment and thus the individual carrier plates can be thinner. On an outer side 136a of the first carrier plate 131a and on outer side 136b of the second carrier plate 131b, in a lower region, there are provided connection strips 138a, 138b with a nearly square cross section. The connection strips 138a, 138b extend over the entire length of the respective plates 131a, 131b. The two connection strips 138a, 138b serve for the fastening of the carrier plates 131a and 131b to the travel route. The cooling plate 135 has its own coolant inlet 140a and a coolant drain 140b.

Figure 5:
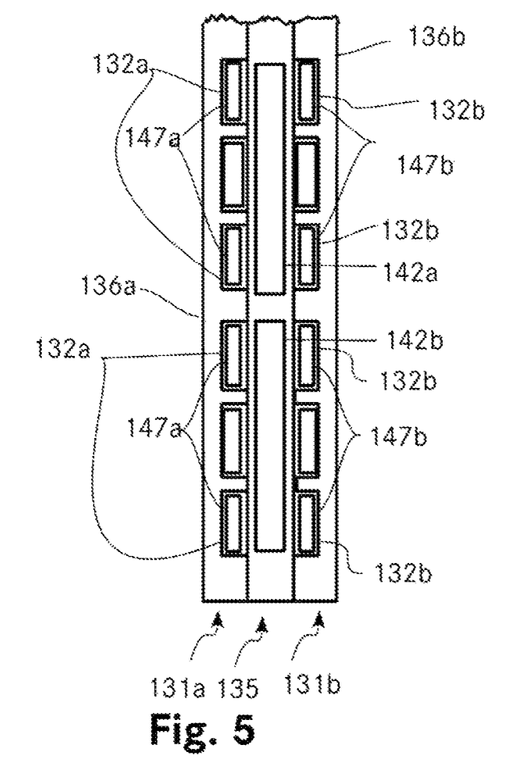
FIG. 5 Simplified schematic representation of a partial cross section V of FIG. 4.

FIG. 5 shows one possible embodiment of the partial cross section V. The cooling plate 135 is monolithic and symmetrical in design. Thanks to the monolithic design, the interfaces which would necessarily occur in a two-piece or multiple-piece design are eliminated. The cooling plate 135 may consist of any given nonmetallic material which is liquid-tight, electrically insulating and temperature-resistant, but preferably it consists of a plastic, such as fiber-reinforced plastic. In this way, the material layers which are required for the sealing of the cooling ducts 42a, 42b in the embodiment of FIGS. 2 and 3 can be omitted: the water-tight layer 44, the water-tight foil 45, and the temperature-resistant adhesive 46, (see FIG. 3). The stator element by contrast with the embodiment of FIG. 2 comprises two carrier plates 131a, 131b, which are arranged symmetrically to the outer sides of the cooling plate 135: the first carrier plate 131a is arranged on a first outer side of the cooling plate 135, the second carrier plate 131b on a second outer side of the cooling plate 135. In the recesses 132a, 132 of the two carrier plates 131a, 131b there is potted each time only one flat coil 147a, b. The flat coils 147 of the first carrier plate 131a form a first winding row and the flat coils 147b of the second carrier plate 147b form a second winding row. The flat coils 147a, 147b of the two winding rows border directly on the cooling housing 135, which can consequently dissipate heat on both sides.

Figure 6:
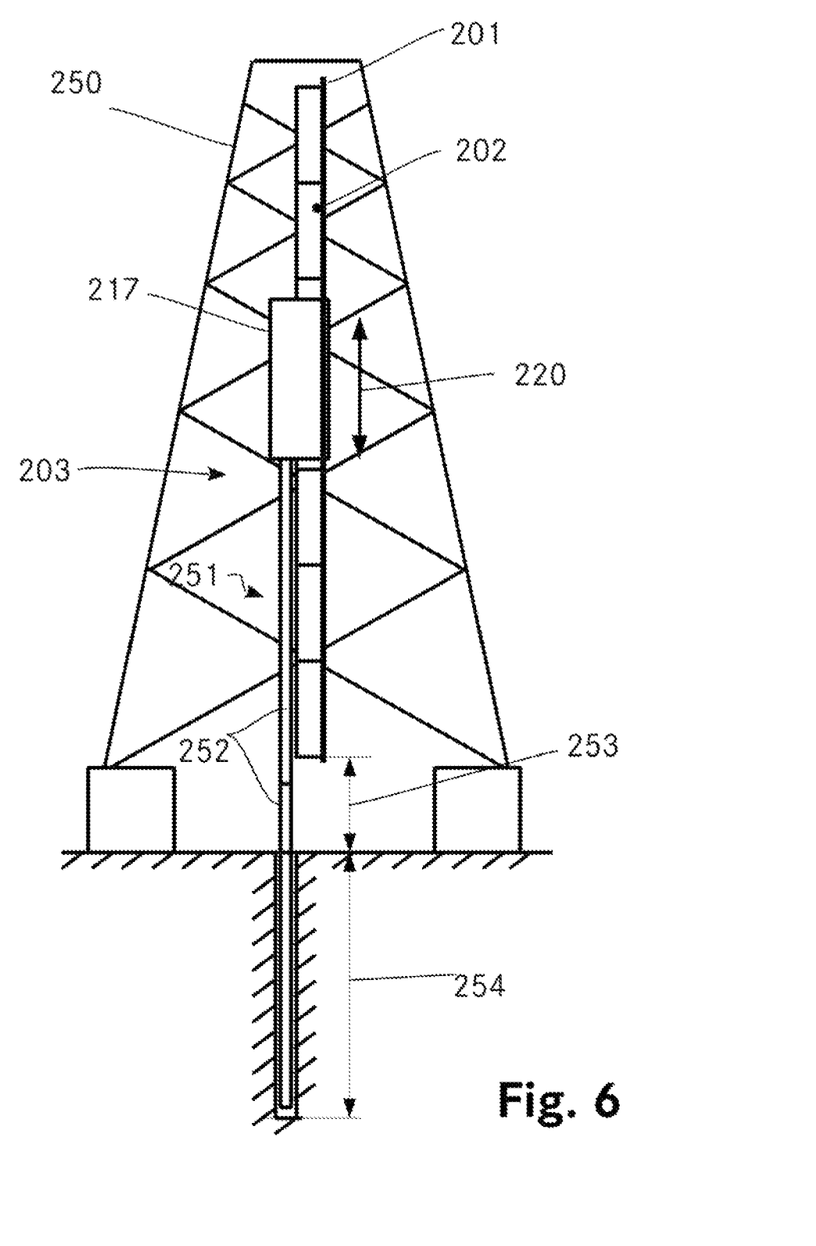
FIG. 6 Schematic representation of a drilling rig with a linear motor drive system according to the invention.

FIG. 6 shows a highly simplified schematic representation of a linear motor drive system according to the invention for the driving of a vehicle 203 along a linear guide 201 of a drilling rig 250, forming the travel route for the vehicle 203. Along the travel route are arranged stator elements 202, with which a rotor 217 with permanent magnets (not visible) arranged on the vehicle interacts and is accelerated or moved respectively in the travel route direction 220. On the vehicle 203 is secured a drilling device with a drilling column 251, which is composed of a plurality of drilling rods 252 of a certain length, the number of drilling rods 252 being dependent both on the drilling depth 253 and the distance of the borehole from the drilling rig 254. Likewise arranged on the vehicle is the rotary drive (not shown), which places the drilling column 251 in rotational movement and which moves along with the vehicle. With increasing drilling depth, successive drilling rods need to be added to the drilling column. For this, each time the vehicle must be driven into an upper position in which a new drilling rod 252 can be installed between the vehicle 203 and the formerly uppermost drilling rod 252. In order to move to the upper position, the vehicle 203 together with the drilling column 251 must be accelerated quickly along the linear guide 201 and also overcome the force of gravity of the vehicle 203 and the drilling column 251, insofar as the force of gravity is not compensated by a weight equalization system. This may be realized, for example, in the form of a hydraulic or pneumatic weight equalization system or also by a counterweight. Once the drilling rod has been installed, the drilling column 251 is then moved back down via the car until the drill bit with the drilling column 251 has again reached its working position, in which the drilling process can be resumed. For this process, a high acceleration is required in order to achieve the shortest possible secondary process time. For example, in order to replace a drill head or after the completion of the drilling process, all drilling rods need to be dismounted once more and for this the vehicle 203 must be moved to the upper position each time for each of the drilling rods 252. If a drilling is resumed with a replaced drill head, once again the previously removed drilling rods 252 need to be installed, for which the vehicle 203 once more needs to be driven back to the upper position for each drilling rod 252 before the drilling column, longer by one rod, can be moved downward by one level once more by the vehicle so that the installing of the next drilling rod is possible. Drilling rigs today reach a height of over 130 m, and borehole depths of over 3000 m, some of which are more than 4000 m below sea level. The time for the installing or removing of the drilling rods and the accelerating of the car is a large portion of the overall drilling process, which means that a great increase in efficiency of the drilling process is possible by a large acceleration of the car. Furthermore, a wave action must also be compensated for ship-based drilling rigs and certain drilling platforms, for which the linear drive system according to the invention is well suited.

The energy transformers for the linear motor drive system may be accommodated both along the drilling rig and also on deck of the drilling ship.

Summarizing, a linear motor drive system has been created which enables an acceleration of a vehicle along a travel route at high velocity on a short distance. Furthermore, a linear motor drive system has been created which enables a reliable and cost-friendly operation and is easy to maintain.

The invention claimed is:

1. A linear motor drive system for the acceleration of a vehicle within an acceleration section on a travel route, especially for passenger transportation in an amusement park, comprising
   a) a stator with at least two stator elements with stator windings arranged along the travel route,
   b) wherein the stator elements are assembled to form at least two stator groups,
   c) and a rotor, which is secured on the vehicle and which is able to interact with a magnetic field generated by the stator,
   wherein
   d) the linear motor drive system includes at least one energy transformer per stator group and wherein each stator group is permanently connected to its own at least one energy transformer for its power supply, which at least one energy transformer can be individually actuated,
   e) wherein at least two of the stator groups are arranged such that the rotor can interact at the same time with the at least two stator groups, wherein these at least two stator groups can be supplied with energy at the same time from their own energy transformer,
   f) and wherein in order to increase the acceleration of the vehicle, the stator is actively cooled.

2. The linear motor drive system according to claim 1, wherein an effective length of the rotor is longer than an effective length of a magnetic field generated by two consecutive stator groups.

3. The linear motor drive system according to claim 1, with a feed unit and with at least a two-strand power supply bus, preferably a d.c. voltage bus, wherein the power supply bus may be connected across the feed unit to a power grid and the energy transformers may be supplied with energy across the power supply bus.

4. The linear motor drive system according to claim 1, comprising an energy accumulator which is connected to the power supply bus and which makes it possible to reduce the feed power or feedback power to or from the power grid, wherein the energy accumulator preferably comprises at least one battery.

5. The linear motor drive system according to claim 1, wherein the energy transformers are inverters, wherein the inverters are preferably multiphase inverters and/or low-voltage inverters, which are preferably all designed for the same power.

6. The linear motor drive system according to claim 1, wherein the active cooling of the stator is a liquid cooling in order to increase the acceleration of the vehicle.

7. The linear motor drive system according to claim 6, wherein
   a) the stator elements comprise at least one first carrier plate made from an electrically nonconductive material,
   b) and a stator winding with at least one flat coil,
   c) which is arranged in a recess of the first carrier plate,
   d) and potted,
   e) and the stator comprises for the liquid cooling at least one cooling element with a sheetlike cooling housing made from a nonmetallic material,
   f) and the carrier plate of the stator element is connected in a sheetlike manner to a first side surface of the cooling housing, so that an outer side surface of the flat coil in relation to the recess is directly adjacent to the cooling housing.

8. The linear motor drive system according to claim 7, wherein
   a) the stator winding of the stator element is multiphase,
   b) the stator element comprises at least one flat coil per phase,
   c) and said flat coils are arranged alongside each other, parallel to the travel route, in recesses of the first carrier plate and define a first row of coils,
   so that the outer side surfaces of said flat coils of the first row of coils, relative to the recesses, lie in the same plane and are directly adjacent to the cooling housing.

9. The linear motor drive system according to claim 7, wherein the stator element comprises a second carrier plate made from electrically nonconductive material and a stator winding with at least one flat coil, which is arranged in a recess of the second carrier plate, and wherein the second carrier plate is connected in a sheetlike manner to a second side surface of the cooling housing, so that an outer side surface of the flat coil of the second carrier plate, in relation to the recess, is directly adjacent to the cooling housing.

10. The linear motor drive system according to claim 8, wherein several flat coils of the multiphase stator winding are arranged alongside each other parallel to the travel route in recesses of the second carrier plate and define a second row of coils and the outside side surfaces of the flat coils of the second row of coils, in relation to the recesses, lie in the same plane and are directly adjacent to the second side of the cooling housing.

11. The linear motor drive system according to claim 7, wherein the cooling elements are designed to be metal-free and/or monolithic.

12. The linear motor drive system according to claim 7, wherein a sensor module is arranged at least between two stator elements in the route direction and wherein the sensor modules serve for determining the absolute position and the speed of the rotor.

13. The linear motor drive system according to claim 1, wherein the rotor comprises a magnetic arrangement with permanent magnets and wherein the magnetic arrangement comprises two parallel rows of magnets, whose poles of opposite polarity stand opposite each other and which surround the stator on both sides along their length.

14. Use of the linear motor drive system according to claim 1 for the acceleration of a vehicle for passenger transportation in an amusement park.

15. Use of the linear motor drive system according to claim 1 for the acceleration of a drilling device of a drilling rig, preferably a ship-based drilling rig.

16. The linear motor drive system according to claim 2, with a feed unit and with at least a two-strand power supply bus, preferably a d.c. voltage bus, wherein the power supply bus may be connected across the feed unit to a power grid and the energy transformers may be supplied with energy across the power supply bus.

17. The linear motor drive system according to claim 2, comprising an energy accumulator which is connected to the power supply bus and which makes it possible to reduce the feed power or feedback power to or from the power grid, wherein the energy accumulator preferably comprises at least one battery.

18. The linear motor drive system according to claim 3, comprising an energy accumulator which is connected to the power supply bus and which makes it possible to reduce the feed power or feedback power to or from the power grid, wherein the energy accumulator preferably comprises at least one battery.

19. The linear motor drive system according to claim 2, wherein the energy transformers are inverters, wherein the inverters are preferably multiphase inverters and/or low-voltage inverters, which are preferably all designed for the same power.

20. The linear motor drive system according to claim 3, wherein the energy transformers are inverters, wherein the inverters are preferably multiphase inverters and/or low-voltage inverters, which are preferably all designed for the same power.

* * * * *